(12) United States Patent
Oetken et al.

(10) Patent No.: US 12,547,186 B2
(45) Date of Patent: Feb. 10, 2026

(54) SHIFTING ONE OR MORE GUIDANCE LINES FOR NAVIGATING AN AGRICULTURAL MACHINE TO FOLLOW CROP ROWS

(71) Applicant: Deere & Company, Moline, IL (US)

(72) Inventors: Glen L. Oetken, Ankeny, IA (US); David August Johnson, Durham, NC (US)

(73) Assignee: DEERE & COMPANY, Moline, IL (US)

( * ) Notice: Subject to any disclaimer, the term of this patent is extended or adjusted under 35 U.S.C. 154(b) by 42 days.

(21) Appl. No.: 18/644,890

(22) Filed: Apr. 24, 2024

(65) Prior Publication Data

US 2025/0334975 A1    Oct. 30, 2025

(51) Int. Cl.
| | |
|---|---|
| *G05D 1/646* | (2024.01) |
| *A01B 79/00* | (2006.01) |
| *G05D 1/224* | (2024.01) |
| *G05D 1/648* | (2024.01) |
| *A01D 41/127* | (2006.01) |
| *A01D 69/00* | (2006.01) |
| *G05D 105/15* | (2024.01) |
| *G05D 107/20* | (2024.01) |

(52) U.S. Cl.
CPC ........... *G05D 1/646* (2024.01); *A01B 79/005* (2013.01); *G05D 1/2245* (2024.01); *G05D 1/648* (2024.01); *A01D 41/1278* (2013.01); *A01D 69/00* (2013.01); *G05D 2105/15* (2024.01); *G05D 2107/21* (2024.01)

(58) Field of Classification Search
CPC ...... G05D 1/646; G05D 1/648; G05D 1/2245; G05D 2105/15; G05D 2107/21; A01B 79/005; A01B 41/1278; A01B 69/00
USPC ............................................................ 701/2
See application file for complete search history.

(56) References Cited

U.S. PATENT DOCUMENTS

| | | | |
|---|---|---|---|
| 10,775,805 B2 | 9/2020 | Thode | |
| 12,372,961 B2* | 7/2025 | Rust ..................... | A01B 69/008 |
| 2017/0354079 A1 | 12/2017 | Foster et al. | |
| 2018/0359907 A1 | 12/2018 | Kelley et al. | |
| 2018/0359908 A1 | 12/2018 | Kelley et al. | |
| 2019/0011912 A1 | 1/2019 | Lockwood et al. | |
| 2020/0053961 A1* | 2/2020 | Dix ...................... | A01D 41/127 |
| 2020/0139959 A1 | 5/2020 | Akella et al. | |
| 2020/0352082 A1* | 11/2020 | Maeder ............... | A01B 69/008 |
| 2022/0110240 A1* | 4/2022 | Maeder ............... | A01B 79/005 |
| 2023/0403969 A1* | 12/2023 | Christiansen ........ | A01B 69/008 |
| 2025/0100450 A1* | 3/2025 | Fujii ..................... | G05D 1/672 |
| 2025/0174030 A1* | 5/2025 | Christiansen ........ | A01B 79/005 |

* cited by examiner

*Primary Examiner* — Mahmoud S Ismail
(74) *Attorney, Agent, or Firm* — Christopher J. Volkmann; KELLY, HOLT & CHRISTENSON PLLC

(57) ABSTRACT

An agricultural harvester includes a navigation system that controls navigation of the agricultural harvester to follow a guidance line. The agricultural harvester is positioned at a desired location to engage the crop. An operator interface is generated with a shift actuator. Operator actuation of the shift actuator is detected, and a line/path shift processor shifts one or more guidance lines based upon the location and orientation of the agricultural harvester and based on the location of the crop rows.

18 Claims, 17 Drawing Sheets

SHIFTING ONE OR MORE GUIDANCE LINES FOR NAVIGATING AN AGRICULTURAL MACHINE TO FOLLOW CROP ROWS

FIELD OF THE DESCRIPTION

The present description relates to agricultural equipment. More specifically, the present description relates to shifting one or more guidance lines used to navigate an agricultural machine along crop rows.

BACKGROUND

There are many different types of mobile agricultural machines. Such machines can include harvesters, sprayers, tillage equipment, planting equipment, among others. Such equipment is often used in processing material in row crops.

For instance, and agricultural harvester includes a header which engages crops as the agricultural harvester travels through a field during a harvesting operation. When the crops are row crops, the agricultural harvester may be provided with a guidance line that is generated by a path planning system based on the location of the crop rows. A navigation system is used to navigate the agricultural harvester to follow the guidance line in performing the harvesting operation. A path planning system may also be used to connect guidance lines to form a harvesting path or route through the field, or through a portion of the field that is being harvested. During harvesting, the route or path may follow any of a variety of different patterns, such as a "spiral in" pattern, a "spiral out" pattern, among others.

The discussion above is merely provided for general background information and is not intended to be used as an aid in determining the scope of the claimed subject matter.

SUMMARY

An agricultural harvester includes a navigation system that controls navigation of the agricultural harvester to follow a guidance line. The agricultural harvester is positioned at a desired location to engage the crop. An operator interface is generated with a shift actuator. Operator actuation of the shift actuator is detected, and a line/path shift processor shifts one or more guidance lines based upon the location and orientation of the agricultural harvester and based on the location of the crop rows.

Example 1 is a computer implemented method, comprising:
  receiving, at a mobile agricultural machine, a set of navigation guidance lines;
  detecting a location and orientation of the mobile agricultural machine relative to crop rows in a field;
  detecting a modification operator input to modify the set of navigation guidance lines;
  re-generating a navigation guidance line, of the set of navigation guidance lines, to obtain a modified navigation guidance line, based on the position and orientation of the mobile agricultural machine relative to the crop rows; and
  controlling a controllable subsystem of the mobile agricultural machine based on the modified navigation guidance line.

Example 2 is the computer implemented method of any or all previous examples wherein controlling a controllable subsystem comprises:
  controlling the controllable subsystem to navigate the mobile agricultural machine to follow the modified navigation guidance line.

Example 3 is the computer implemented method of any or all previous examples wherein re-generating a navigation guidance line comprises:
  re-generating a navigation guidance line based on a current location of the mobile agricultural machine and retaining locations of a remainder of the navigation guidance lines in the set of navigation guidance lines.

Example 4 the computer implemented method of any or all previous examples wherein controlling the controllable subsystem to navigate the mobile agricultural machine to follow the modified guidance line comprises:
  detecting that the mobile agricultural machine has finished traversing a portion of the field along the modified navigation guidance line; and
  controlling the controllable subsystem to navigate the mobile agricultural machine along a navigation guidance line, of the remainder of the navigation guidance lines.

Example 5 is the computer implemented method of any or all previous examples wherein re-generating a navigation guidance line comprises:
  re-generating all the navigation guidance lines in the set of navigation guidance lines based on the position and orientation of the mobile agricultural machine relative to the crop rows.

Example 6 is the computer implemented method of any or all previous examples wherein detecting a modification operator input comprises:
  generating a representation of an operator display with a first guidance line adjustment actuator; and
  detecting operator actuation of the first guidance line adjustment actuator, and wherein re-generating a navigation guidance line comprises modifying a single navigation guidance line based on the detected operator actuation of the first guidance line adjustment actuator.

Example 7 is the computer implemented method of any or all previous examples wherein detecting a modification operator input comprises:
  generating a representation of an operator display with a second guidance line adjustment actuator; and
  detecting operator actuation of the second guidance line adjustment actuator, and wherein re-generating a navigation guidance line comprises shifting the navigation guidance lines in the set of navigation guidance lines based on the detected operator actuation of the second guidance line adjustment actuator.

Example 8 is the computer implemented method of any or all previous examples wherein detecting a modification operator input comprises:
  detecting the modification operator input from a remote device that is remote from the mobile agricultural machine.

Example 9 is the computer implemented method of any or all previous examples wherein detecting a modification operator input comprises:
  detecting the modification operator input from a device in an operator compartment of the mobile agricultural machine.

Example 10 is the computer implemented method of any or all previous examples wherein re-generating a navigation guidance line comprises:
  obtaining a location of the crop rows; and
  re-generating the navigation guidance line to follow the crop rows.

Example 11 is the computer implemented method of any or all previous examples wherein receiving a set of navigation guidance lines comprises:
generating a path plan, including the set of navigation guidance lines, that defines a route of the mobile agricultural machine through a field.

Example 12 is a navigation control system for controlling navigation of a mobile agricultural machine, the navigation control system comprising:
a path planning system configured to generate a set of navigation guidance lines;
a position sensor configured to detect a location and orientation of the mobile agricultural machine relative to crop rows in a field;
an operator interface system configured to detect a modification operator input to modify the set of navigation guidance lines;
a shift processor configured to re-generate a navigation guidance line, of the set of navigation guidance lines, to obtain a modified navigation guidance line, based on the position and orientation of the mobile agricultural machine relative to the crop rows and responsive to the modification operator input; and
a navigation system configured to control a controllable subsystem of the mobile agricultural machine based on the modified navigation guidance line.

Example 13 is the navigation control system of any or all previous examples wherein the controllable subsystem comprises a propulsion subsystem and a steering subsystem and wherein the navigation system is configured to control the propulsion subsystem and the steering subsystem to navigate the mobile agricultural machine to follow the modified navigation guidance line.

Example 14 is the navigation control system of any or all previous examples wherein the set of navigation guidance lines comprises a plurality of navigation guidance lines and wherein the shift processor is configured to re-generate the navigation guidance line based on a current location of the mobile agricultural machine and retain locations of a remainder of the plurality of navigation guidance lines in the set of navigation guidance lines.

Example 15 is the navigation control system of any or all previous examples wherein the navigation control system is configured to detect that the mobile agricultural machine has finished traversing a portion of the field along the modified navigation guidance line and control the controllable subsystem to navigate the mobile agricultural machine along a navigation guidance line, of the remainder of the navigation guidance lines.

Example 16 is the navigation control system of any or all previous examples wherein the shift processor is configured to re-generate all of the plurality of navigation guidance lines in the set of navigation guidance lines based on the position and orientation of the mobile agricultural machine relative to the crop rows.

Example 17 is the navigation control system of any or all previous examples wherein the operator interface system is configured to generate a representation of an operator interface display with a first guidance line adjustment actuator; and detect, as the modification operator input, operator actuation of the first guidance line adjustment actuator, and wherein the shift processor is configured to modify a single navigation guidance line based on the detected operator actuation of the first guidance line adjustment actuator.

Example 18 the navigation control system of any or all previous examples wherein the operator interface system is configured to generate a representation of an operator interface display with a second guidance line adjustment actuator and detect, as the modification operator input, operator actuation of the second guidance line adjustment actuator, and wherein the shift processor is configured to shift the plurality of navigation guidance lines in the set of navigation guidance lines based on the detected operator actuation of the second guidance line adjustment actuator.

Example 19 is a computer system, comprising:
a sensor configured to sense a location and orientation of a mobile agricultural machine relative to a location of crop rows in a field;
at least one processor;
a data store storing computer executable instructions which, when executed by the at least one processor, cause the at least one processor to perform steps, comprising:
detecting an operator input indicative of a request to generate a navigation guidance line;
generating the navigation guidance line based on the location and orientation of the mobile agricultural machine relative to the crop rows; and
generating control signals to control a controllable subsystem of the mobile agricultural machine to navigate the mobile agricultural machine based on the navigation guidance line.

Example 20 is the computer system of any or all previous examples wherein generating a control signal to control a controllable subsystem comprises:
generating the control signals to control the controllable subsystem to navigate the mobile agricultural machine to follow the navigation guidance line This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, many mobile agricultural machines have access to a path planning system that knows locations of rows in a field and generates guidance lines that can be used to navigate the mobile agricultural machine through the field based upon the locations of the rows and based upon machine locations. The present example will proceed with respect to the mobile agricultural machine being an agricultural harvester, but this is just one example and other mobile agricultural machines (e.g., planting machines, tillage machines, sprayers, etc.) can be used as well.

As an example, the path planning system may access data indicative of the dimensions of the harvester (e.g., the harvester is a 12 row harvester, an 8 row harvester, etc.) as well as data indicative of the location of the crop rows (e.g., a map showing the crop as-planted). The path planning system then generates a set of guidance lines that can be used to navigate the harvester through the field based upon the machine dimensions and the location of the crop rows, in order to perform the harvesting operation. The path planning system may connect the guidance lines (e.g., at the headland turns) to define a route, and the navigation system can control the agricultural harvester to automatically navigate the agricultural harvester along the route. In one example, the field may be harvested in sections (or lands) according to one of a variety of different harvesting patterns, such as a spiral-in pattern, a spiral-out pattern, etc. The path planning system can be configured to generate the harvesting route in the field sections as well.

It may happen, however, that a guidance line is located in an undesirable location because of obstacles or issues with respect to the terrain in a field. For instance, there may be obstacles in a field, a waterway in a field, etc. Further, the guidance line may be located in an undesirable location based on the row shapes and/or what portions of the field have already been harvested, and/or for other reasons.

Figure 1:
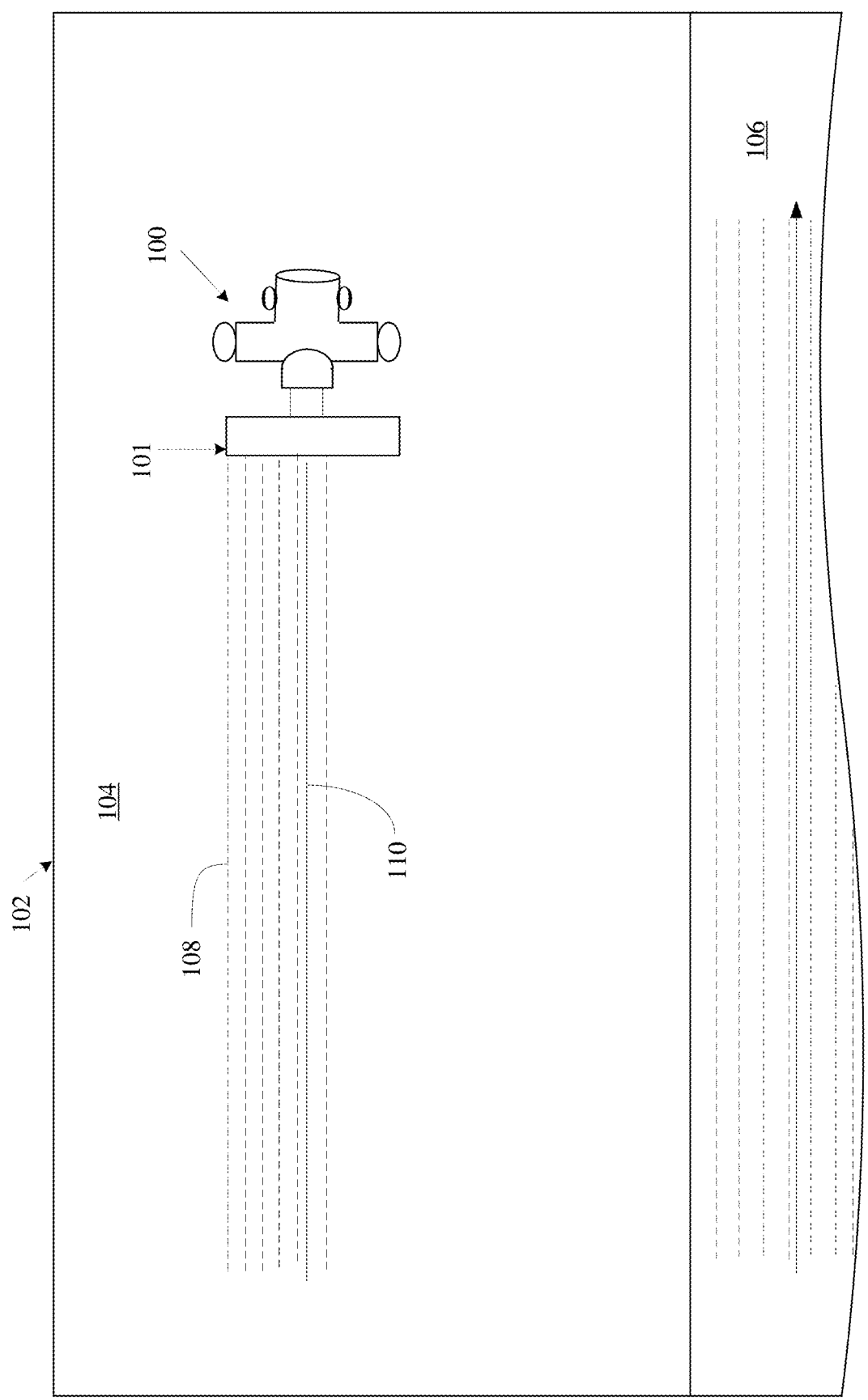
FIG. 1 is a pictorial illustration showing a harvester positioned to follow a guidance line that results in an uneven load on a header of the harvester.

FIG. 1 is a pictorial illustration showing one example in which a mobile agricultural machine is a harvester 100 that is harvesting crop in a field 102. The portion of the field 102 that is unharvested is indicated by the dashed rows in FIG. 1, which represent crop rows. In the example shown in FIG. 1, the field has been divided into multiple sections (or lands) 104-106 and harvester 100 harvests each of those sections or lands individually, before proceeding to the next section or land. FIG. 1 thus shows that harvester 100 has harvested all of section 104 of field 102 except for the unharvested crop generally illustrated at 108. FIG. 1 also shows that harvester 100 is positioned to follow a previously-generated guidance line 110 (e.g., a header 101 or harvester 100 is centered on guidance line 110) to make a final pass in section 104 to harvest the unharvested crop material 108. However, if harvester 100 follows guidance line 110, that means that the center of the header 101 on harvester 100 will be aligned with guidance line 110. This means that the right side of header 101 will have a disproportionately large crop load while the left side of header 101 has either very low crop load or no crop load at all. This can result in problems in that the conveyor that moves the harvested material to the central portion of header 101 and back into the feeder house of harvester 100 may be unbalanced because the right side of the conveyor will be fully loaded while the left side of the conveyor is not.

Therefore, the present description describes a system in which harvester 100 can be moved to a desirable position, and the guidance line 110 will be shifted based upon the location of the unharvested crop rows 108 and the location of harvester 100. In one example, only guidance line 110 is shifted and the locations of the remaining guidance lines in field 102 (e.g., those in section 106) remain the same. In another example, if guidance line 110 is shifted, all of the remaining guidance lines are also shifted in the same direction, by the same amount. The new guidance lines (or modified guidance lines) follow the crop row shapes and are generated based upon the machine dimensions (such as the header width). This also allows the operator to quickly shift the guidance lines to enhance the operation of harvester 100.

Figure 2:
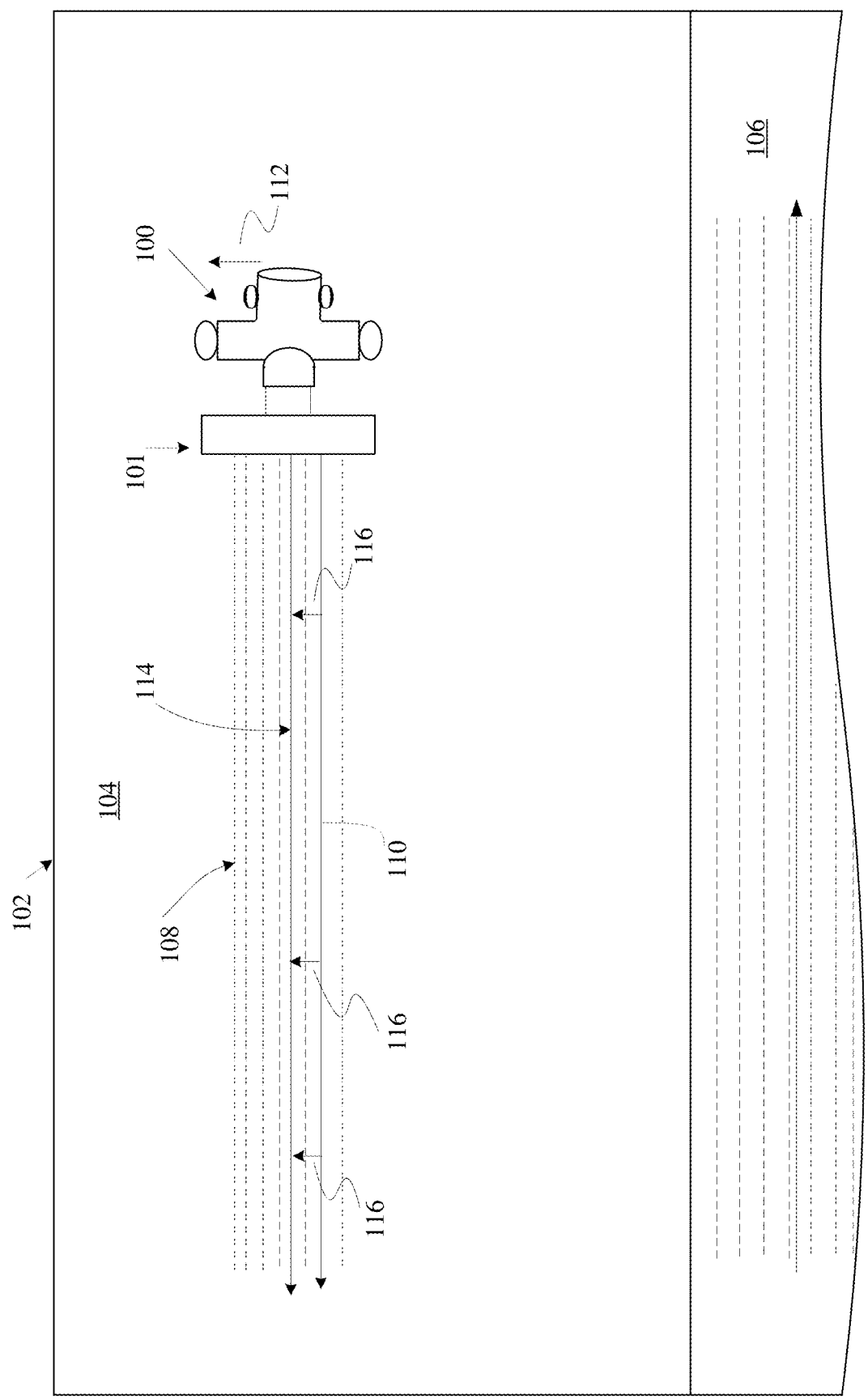
FIG. 2 is a pictorial illustration showing the harvester repositioned, and a new guidance line that is in a position that is shifted from the previous guidance line based on the position of the harvester and the location of crop rows.

FIG. 2, for example, is a pictorial illustration that is similar to FIG. 1, and similar items are similarly numbered. However, in FIG. 2, harvester 100 has been repositioned, from the position shown in FIG. 1, relative to the unharvested crop rows 108 in the direction generally indicated by arrow 112. It can now be seen that the center of header 101 is aligned with the longitudinal center of the unharvested crop rows 108. An operator interface system generates an operator interface that allows the operator of harvester 100, or another user (such a user at a remote location), to actuate a user interface actuator which causes the guidance line 110 to be shifted to the location of guidance line 114 in the direction indicated by arrows 116. A navigation system on harvester 100 can now use guidance line 114 to control navigation of harvester 100 to harvest the unharvested crop rows 108 in section 104 of field 102 so that the harvested material feeding on the conveyor in header 101 is more balanced. In the example shown with respect to FIG. 2, the other guidance lines (e.g., the guidance lines in section 106) are unchanged and only guidance line 110 is repositioned to the location illustrated by guidance line 114. Thus, it can be seen that the path planning system has recalculated (or re-generated) the position of guidance line 110 to that shown as guidance line 114 based upon the new location of harvester 100, and based upon the location of unharvested rows 108.

Figure 3:
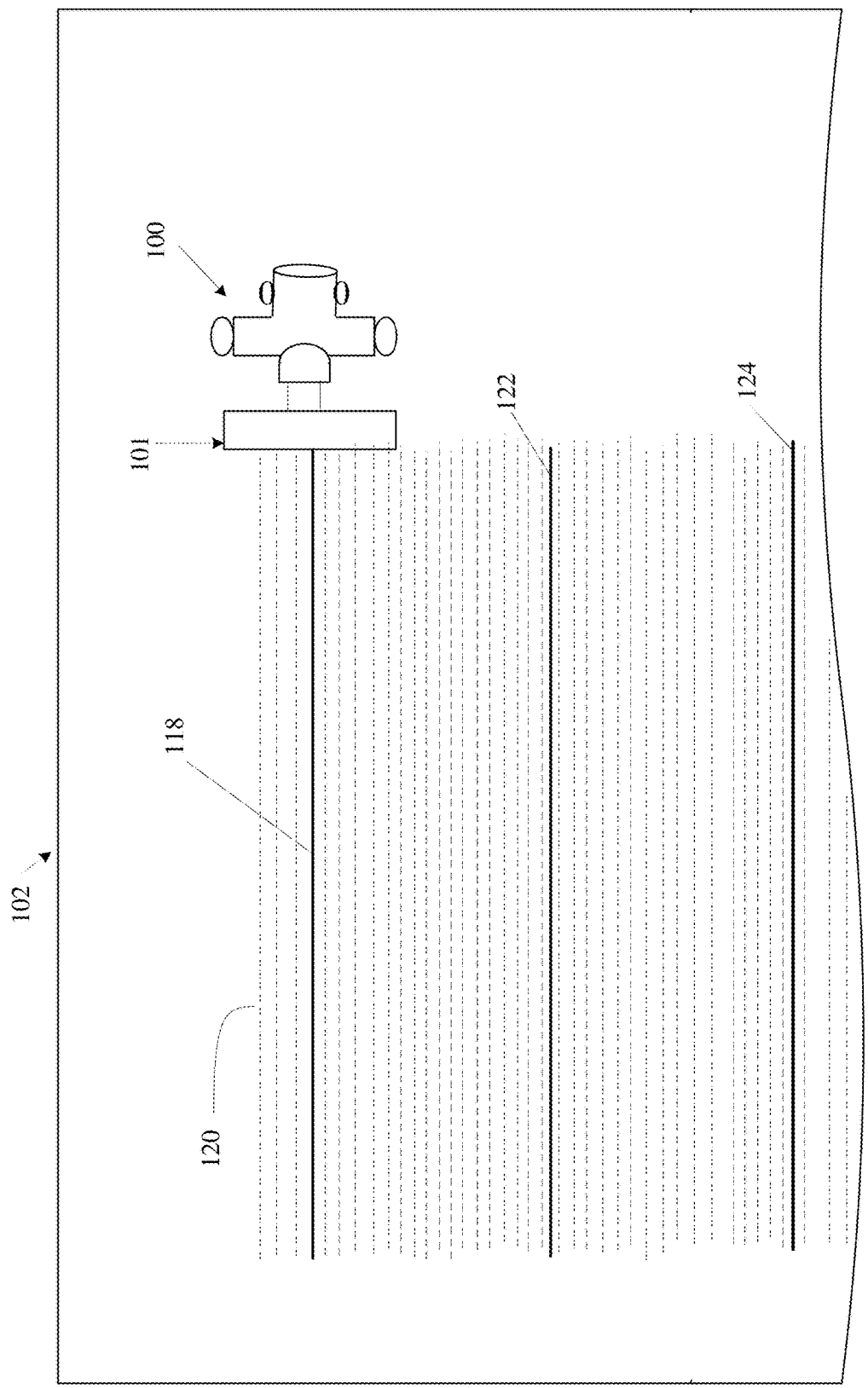
FIG. 3 is a pictorial illustration in which a harvester is positioned to follow a guidance line that results in an uneven load on a header of the harvester.

FIG. 3 is a pictorial illustration of harvester 100 in field 102. Again, it can be seen that harvester 100 is aligned with a guidance line 118 to harvest the unharvested crop rows 120 in field 102. It can also be seen that if harvester 100 follows guidance line 118, the right side of header 101 will be unbalanced relative to the left side of header 101 because only part of the right side will be engaging crops while the entire left side will be engaging crops. FIG. 3 also shows that there are a plurality of additional guidance lines 122-124 that have been generated to navigate harvester 100 through the unharvested portion 120 of field 102.

Figure 4:
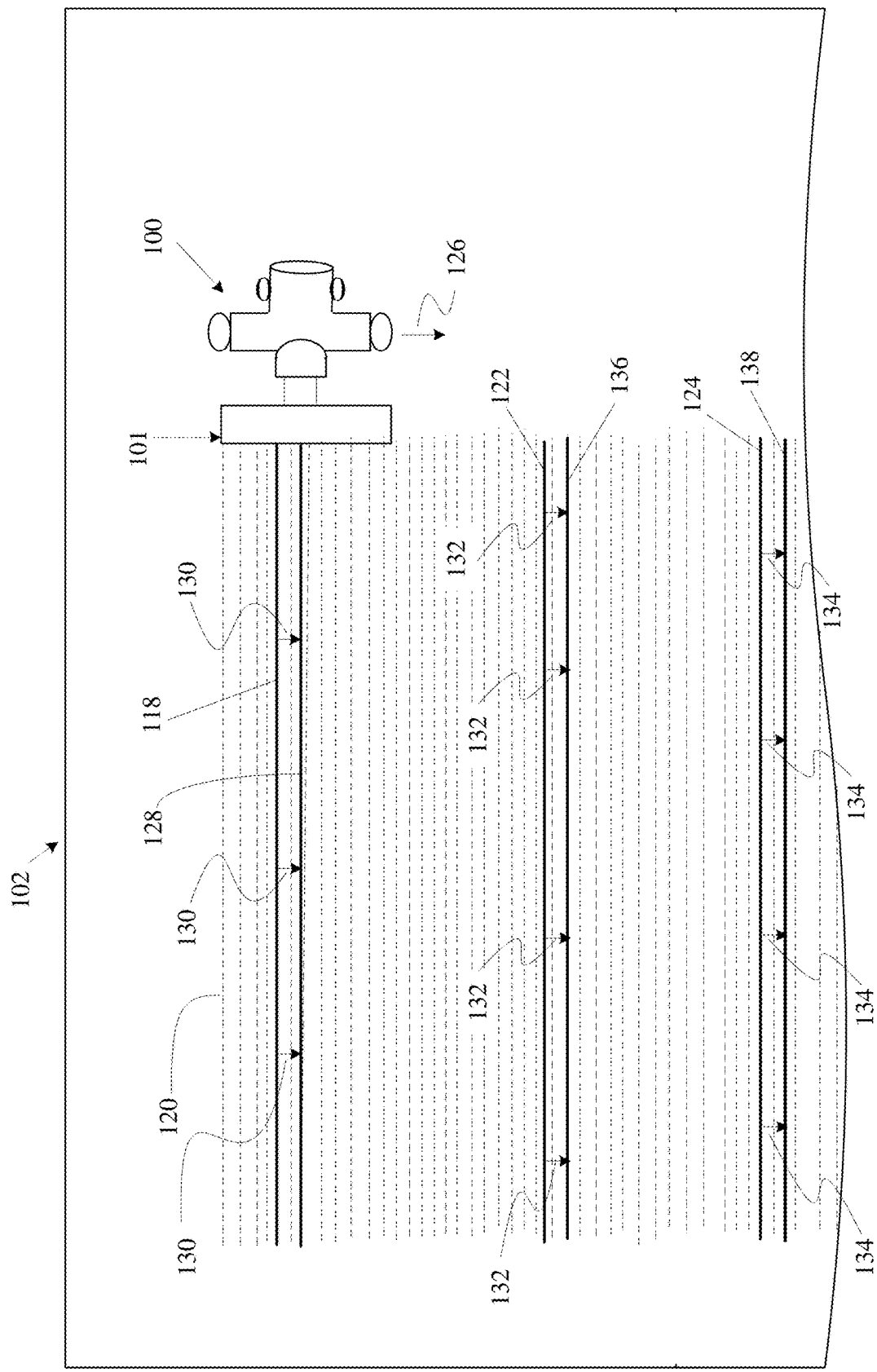
FIG. 4 is a pictorial illustration showing that the harvester is repositioned and that a plurality of guidance lines have been shifted based upon the new position of the harvester and the location of crop rows.

FIG. 4 is a pictorial illustration that is similar to FIG. 3 and similar items are similarly numbered. However, in FIG. 4 it can be seen that harvester 100 has now been repositioned, relative to its position in FIG. 3, generally in the direction indicated by arrow 126 relative to the unharvested crop rows 120 in field 102. Thus, the header 101 is now more desirably positioned to fully engage the unharvested crop rows 120 as opposed to the position shown in FIG. 3.

In one example, the path planning system on harvester 100 generates an operator interface that can be actuated by the operator so that the path planning system will recalculate or adjust the position of guidance line 118 to that shown as 128 in FIG. 4 based on the new position of harvester 100 and based on the location of the unharvested crop rows 120. Thus, the position of guidance line 118 is effectively shifted in the direction indicated by arrows 130 based upon the new location of harvester 100 and the location of the unharvested crop rows 120.

Unlike the example shown in FIG. 2, however, in the example shown in FIG. 4, all of the additional guidance lines 122-124 in field 102 (or those in the same section of field 102 as guidance line 118) are also shifted in the direction indicated by arrows 132 and 134, respectively, by the same amount that guidance line 118 was shifted. Thus, guidance line 122 is shifted to a new location represented by guidance line 136, and guidance line 124 is shifted to a new location represented by guidance line 138. It will be understood that additional guidance lines in field 102 (which are not shown) may be shifted as well.

Thus, in the example shown with respect to FIG. 2, a single guidance line can be re-generated or shifted based upon the location of harvester 100 and the location of the unharvested crop rows, without changing the position of the other guidance lines. In the example shown in FIG. 4, the position of a guidance line can be recalculated or shifted based upon the location of harvester and the location of the unharvested crop rows, and some or all other guidance lines can be shifted as well. It will be noted that all of the guidance lines that are shifted are shifted in a way so that they follow the orientation of the crop rows. Therefore, in FIG. 4, for example, if the crop rows started to curve (such as around a waterway or an obstacle) in the area of guidance line 124, then the shifted guidance line 138 would be shifted by the same amount as indicated by arrow 134, but guidance line 138 would also follow the shape of the crop rows (around the waterway or obstacle) in that location.

Figure 5:
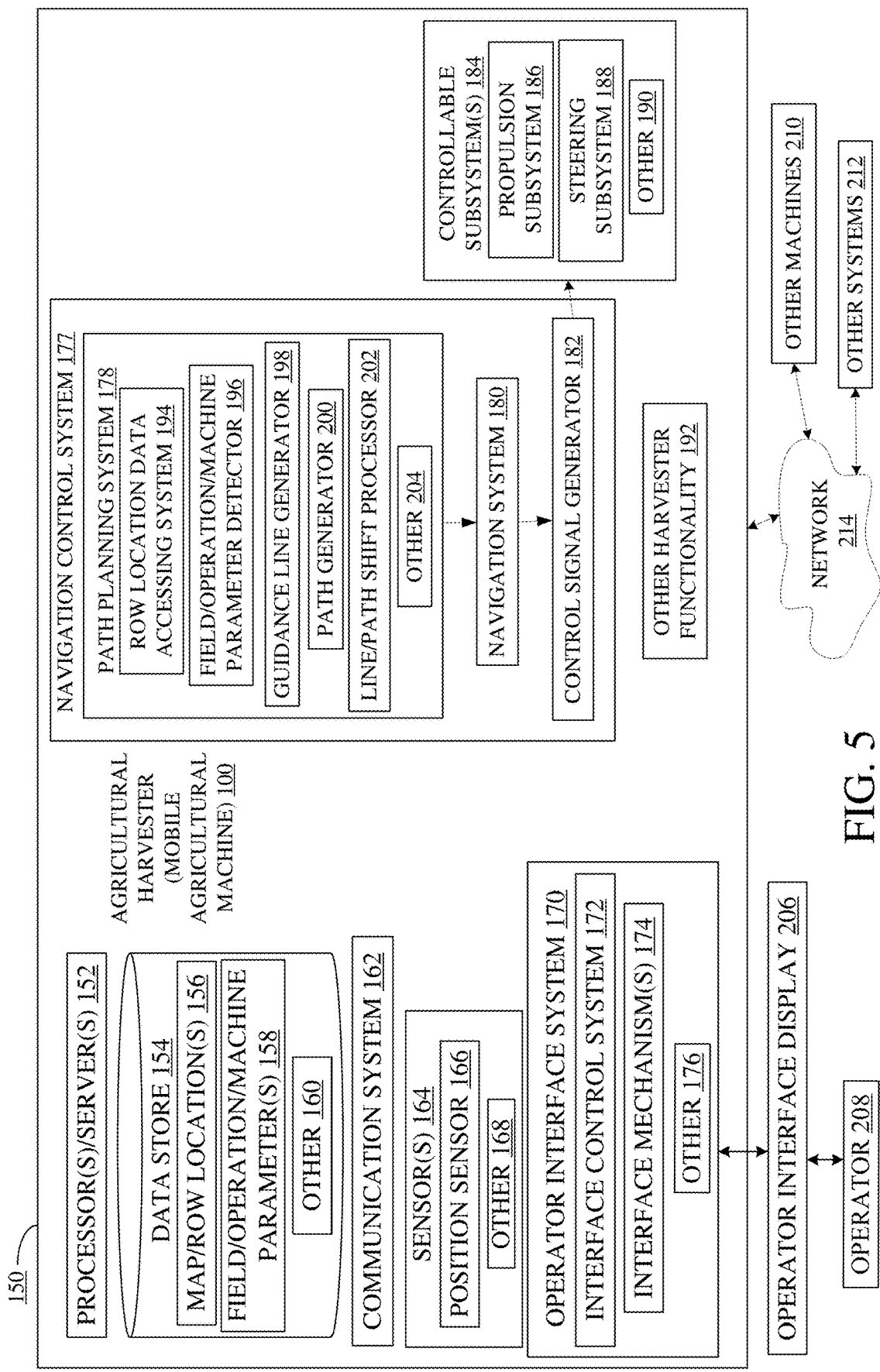
FIG. 5 is an agricultural system showing a block diagram of an agricultural harvester in more detail.

FIG. 5 is a block diagram showing one example of an agricultural system 150 in which agricultural harvester (e.g., mobile agricultural machine) 100 is shown in more detail. In the example shown in FIG. 5, agricultural harvester 100 includes one or more processors or servers 152, data store 154 (which can include map/row locations 156, field/operation/machine parameters 158, and other items 160), communication system 162, sensor 164 (which can include position sensor 166 and other sensors 168), operator interface system 170 (which can include interface control system 172, interface mechanisms 174, and other items 176), path planning system 178, navigation system 180, control signal generator 182, controllable subsystems 184 (which can include propulsion subsystem 186, steering subsystem 188, and other subsystems 190), and other harvester functionality 192. Path planning system 178 includes row location data accessing system 194, field/operation/machine parameter detector 196, guidance line generator 198, path generator 200, line/path shift processor 202, and other items 204. FIG. 5 also shows that, in one example, operator interface system 170 can generate an operator interface display 206 for interaction by an operator 208. Operator interface display 206 may be displayed on a display screen, with operator actuatable input mechanisms that can be actuated by operator 208 using a point and click device, using touch gestures, and/or using voice commands. Operator interface display 206 may display information for operator 208 as well. The displayed information can be alphanumeric information, images (static images or video images), graphical images, and/or any of a wide variety of other information. Thus, operator 208 can interact with operator interface display 206 to control and manipulate some portions of agricultural harvester 100.

FIG. 5 also shows that, in one example, agricultural harvester 100 can be connected to other machines 210 or other systems 212 over network 214. Other machines 210 may be tender vehicles, other agricultural harvesters, or other agricultural machines. Other systems 212 may include a farm manager system, vendor systems, maintenance systems, manufacturer systems, and/or any of a wide variety of other systems.

Network 214 can be a wide area network, a local area network, a Bluetooth or Wi-Fi network, a near field communication network, a cellular communication network, or any of a wide variety of other networks or combinations of networks. Before describing the overall operation of agricultural system 150 in more detail, a description of some of the items in agricultural system 150, and their operation, will first be described.

Map/row locations 156 may include a map of a field that agricultural harvester 100 is currently harvesting, or is about to harvest. The map/row locations 156, in one example, identify the locations of crop rows in the field. Field/operation/machine parameters 158 may include parameters for the field, for the operation, and for the machine. For instance, the field parameters may identify the boundary of the field, obstacles in the field, and any other parameters that may affect the path that agricultural harvester 100 follows in order to perform the agricultural operation in the field (e.g., in order to harvest the field). The operation parameters may include such things as whether the field is divided into sections or zones (e.g., lands) that are to be harvested, any harvesting patterns that are to be used (such as a spiral-in pattern, a spiral-out pattern, etc.), and other parameters of the harvesting operation that may affect the path that agricultural harvester 100 takes in harvesting the field. The machine parameters may include such things as the machine dimensions (e.g., whether the header 101 is an 8-row head, a 12-row head, etc.), the turning radius of agricultural harvester 100, and/or any other parameters that may affect the path that agricultural harvester 100 follows in harvesting the field.

Communication system 162, in one example, facilitates the communication of items on agricultural harvester 100 with one another, and also facilitates communication over network 214. Therefore, communication system 162 can include a controller area network (CAN) bus and bus controller, and other communication system functionality that can be used to communicate over network 214.

Position sensor 166 generates a sensor signal indicative of a position of agricultural harvester 100 in a global or local coordinate system. Therefore, position sensor 166 can be a global navigation satellite system (GNSS) receiver, a cellular triangulation system, a dead reckoning system, one or more inertial measurement units and/or accelerometers, among other types of sensors. Sensors 164 can include other sensors 168 which provide other sensor signals. The other sensor signals may provide an output indicative of the orientation and/or heading of agricultural harvester 100, the speed of agricultural harvester 100, the direction of travel and/or route of harvester 100, and/or any other items. Further, sensors 164 can also include sensors that provide outputs to path planning system 178 and navigation system 180 to allow path planning system 178 to plan a path and navigation system 180 to control navigation of agricultural harvester 100 to follow that path. Thus, sensors 164 can include obstacle sensors, visual or other perception sensors, RADAR, LIDAR, or ultrasonic sensors, among others.

Interface mechanisms 174 can include any of a wide variety of different types of operator interface mechanisms, such as a steering wheel, joysticks, pedals, levers, linkages, knobs, buttons, display screens, and/or any of a wide variety of other audio, visual, and/or haptic mechanisms that provide information to operator 208 and/or receive inputs from operator 208. Interface control system 172 can generate an output that can be displayed on operator interface display 206 and can also detect operator interaction with operator interface display 206 and interface mechanisms 174. Interface control system 172 can control operator interface display 206 based upon the detected operator inputs and can also generate an output indicative of how operator 208 interacts with the operator interface displays 206 or other interface mechanisms 174.

Path planning system 178 accesses the maps/row locations 156 and parameters 158 and generates a set of guidance lines that can be used by navigation system 180 to guide agricultural harvester 100 along each different pass through the field it is harvesting. The guidance lines can be connected with one another (e.g., at the headland turns) in order to form a harvesting route that agricultural harvester 100 follows in order to harvest the field. Path planning system 178 may be a local or a global path planning system. Path planning system 178 can implement any of a wide variety of different algorithms, such as the Dijkstra algorithm, an A-star algorithm, a D-star algorithm, and/or any of a wide variety of other path planning algorithms.

More specifically, row location data accessing system 194 accesses map/row locations 156 from data store 154 or elsewhere. The map/row locations 156 can be generated during planting or during other times (such as at emergence, or during other periods). Row location data accessing system 194 generates an output indicative of the locations of the rows in the field. Field/operation/machine parameter detector 196 either detects or accesses parameters 158. The field parameters can be accessed through a map or on-board detectors or remote detectors and may identify such things as field boundaries, obstacles, soil types, traction quality, etc. The operation parameters can be default parameters, or they can be detected based on operator inputs through an operator interface display 206 or using other interface mechanisms 174. The operation parameters may specify lands, harvesting patterns, etc. The machine parameters can be detected (such as by detecting the width of header 101 and other machine parameters), or the machine parameters can be stored in or accessed from datastore 154 or through operator inputs or in other ways.

Guidance line generator 198 uses the row locations and parameters to generate guidance lines (such as those described above with respect to FIGS. 1-4) that navigation system 180 can use to instruct control signal generator 182 to control controllable subsystems 184 so that agricultural harvester 100 is navigated to follow the guidance lines. Path generator 200 can connect the guidance lines (such as at the headlands or in other ways) based upon the parameters, in order to generate a path or route that agricultural harvester 100 can follow in order to harvest the field or land. Line/path shift processor 202 can be used to shift either a single guidance line or a set of guidance lines based upon the position and orientation of agricultural harvester 100, and based upon the locations of the crop rows in the field. For instance, as discussed above with respect to FIG. 2, operator 208 can reposition agricultural harvester to the position shown in FIG. 2 and actuate an operator input mechanism indicating that a guidance line should be repositioned. In that case, line/path shift processor 202 recalculates the current guidance line to shift it so that agricultural harvester 100 is centered on the guidance line (e.g., to shift guidance line 110 to guidance line 114 shown in FIG. 2). Line/path shift processor 202 generates an output to navigation system 180 indictive of the new location of guidance line 114.

In another example, line/path shift processor 202 generates an output to shift a set of guidance lines. For instance, as described in more detail above with respect to FIG. 4, operator 208 can change the position of agricultural harvester 100 and actuate an operator interface mechanism. In response, line/path shift processor 208 will shift a set of guidance lines to new positions (e.g., shift guidance lines 118, 122, and 124 to guidance lines 128, 136, and 138 in FIG. 4) based upon the location and orientation of agricultural harvester 100 and based upon the location of the crop rows.

Navigation system 180 receives the output from path planning system 178 indicative of a current guidance line (and a current path) and generates an output to control signal generator 182 so that control signal generator 182 generates control signals to control the steering subsystem 188 and propulsion subsystem 166 on agricultural harvester 100 to follow a current guidance line and a current path. Navigation system 180 can include deterministic, non-deterministic, or other types of algorithms. Such systems can include path guidance or other systems as well.

Control signal generator 182 generates control signals to control the controllable subsystems 184. Propulsion subsystem 186 can include a combustion engine, one or more different hydraulic motors, electric motors, etc. Propulsion subsystem 186 provides power to propel agricultural harvester 100. Propulsion subsystem 186 can provide propulsion to ground-engaging elements, such as wheels or tracks, through a transmission or by a direct drive system. Propulsion subsystem 186 can provide propulsion to all of the wheels or ground-engaging elements or to one or more subsets of the wheels or ground-engaging elements. Steering subsystem 188 can include a steering wheel, joystick, steerable wheels, tracks, or wheels or other ground-engaging elements that can be steered in a skid steer fashion, or other elements.

Figure 6:
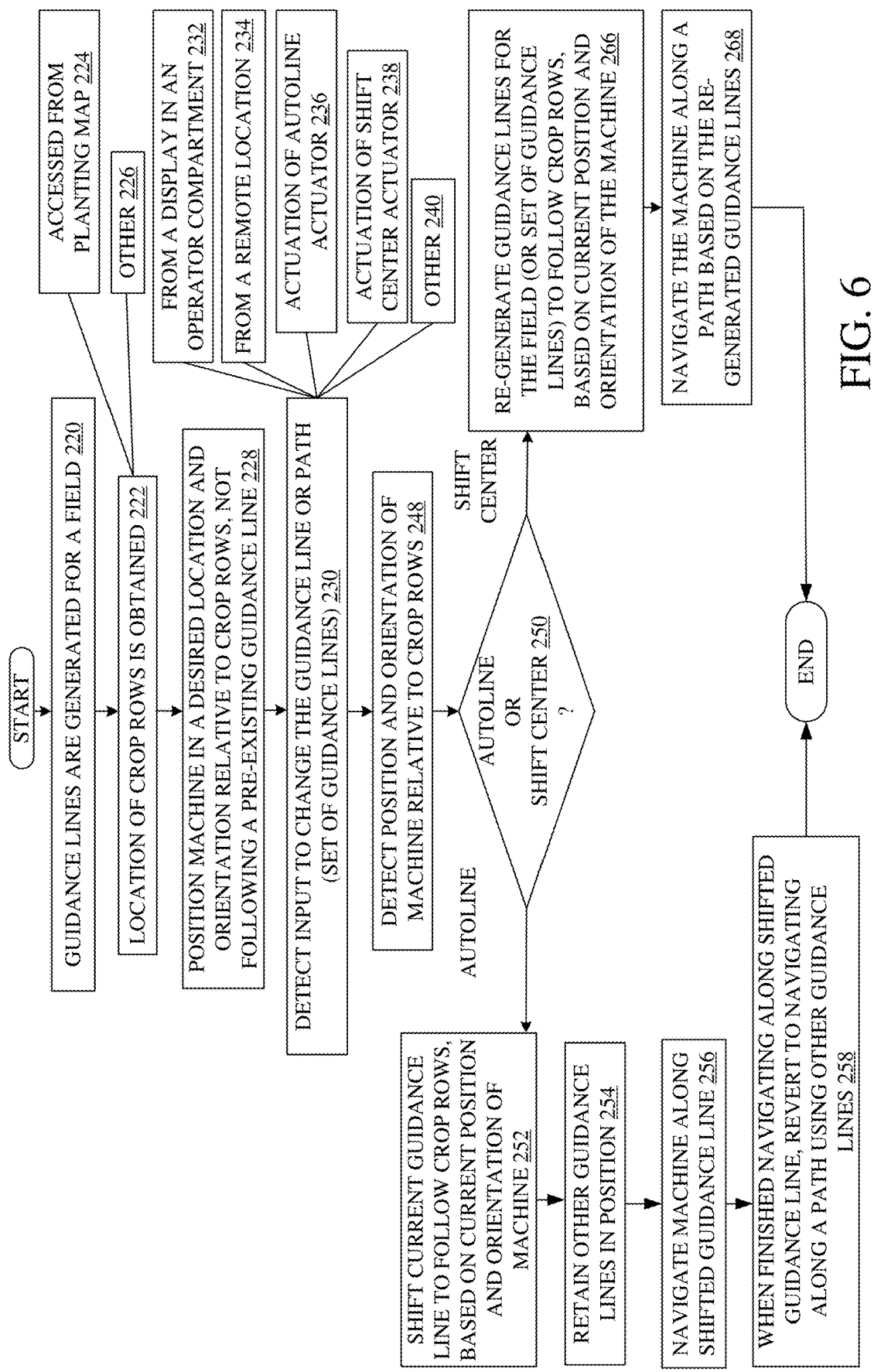
FIG. 6 is a flow diagram illustrating one example of the operation of a path planning system in making adjustments to one or more guidance lines.

FIG. 6 is a flow diagram illustrating one example of the operation of path planning system 178 and navigation system 180 in generating a guidance line or path which agricultural harvester 100 follows in harvesting a field, and also in shifting one or more guidance lines. It is first assumed that a set of guidance lines are generated by guidance line generator 198 for a field that is being harvested or that is about to be harvested. Generating the guidance lines is indicated by block 220 in the flow diagram of FIG. 6.

Row location data accessing system 194 then obtains the location of the crop rows in the field, as indicated by block 222. System 194 can access that data from maps or other crop row location information 156 that are generated during planting or during other agricultural operations. Accessing information from a planting map is indicated by block 224. The locations of the crop rows can be obtained in other ways as well, as indicated by block 226.

Operator 208 then positions agricultural harvester 100 in a desired location and orientation relative to the crop rows in which agricultural harvester 100 is not necessarily aligned to follow a pre-existing guidance line. Positioning agricultural harvester 100 in this way is indicated by block 228 in the flow diagram of FIG. 6. It will be noted that operator 208 can be a local operator in the operating compartment of harvester 100 or a remote operator. Operator 208 may be a human operator or an automated system as well. Examples of operator 208 positioning agricultural harvester 100 in a location and orientation so that it is not centered on an existing guidance line are described above with respect to FIGS. 2 and 4.

Line/path shift processor 208 detects an operator input to re-generate a guidance line or path (e.g., a set of guidance lines) as indicated by block 230 in the flow diagram of FIG. 6. In one example, operator 208 may actuate an operator actuatable input mechanism on a display 206 in order to request a change to a guidance line. In response, line/path shift processor 202 may generate an output indicative of a user interface display that allows the user to indicate when agricultural harvester 100 is in a desired position for re-generation of the guidance line. In another example, where operator 208 is in a remote location, operator 208 may provide an input from the remote location. Providing an input to shift one or more guidance lines from the operator compartment of harvester 100 is indicated by block 232. Providing such an input from a remote location is indicated by block 234. In one example, where operator 208 wishes to shift only a single guidance line, operator 208 can actuate an "auto line" actuator, as indicated by block 236. Where operator 208 wishes to shift or relocate a set of guidance lines (e.g., more than one guidance line) then operator 208 may actuate a "shift center" actuator, as indicated by block 238. The operator input can be provided in other ways as well, as indicated by block 240.

Figure 7:
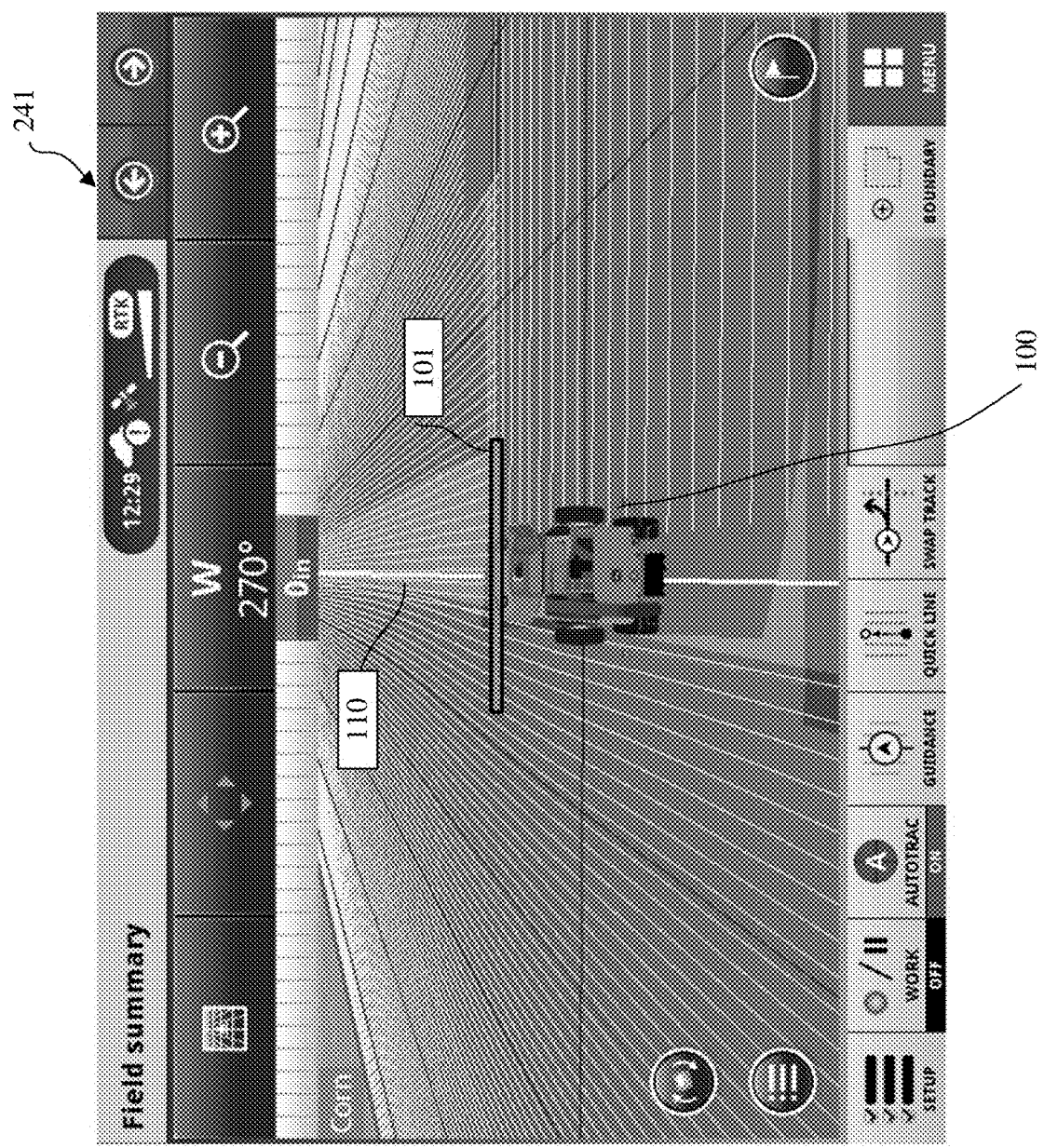
FIGS. 7, 8, 9, 10, 11, and 12 show examples of user interface displays that can be generated in shifting one or more guidance lines.
Figure 8:
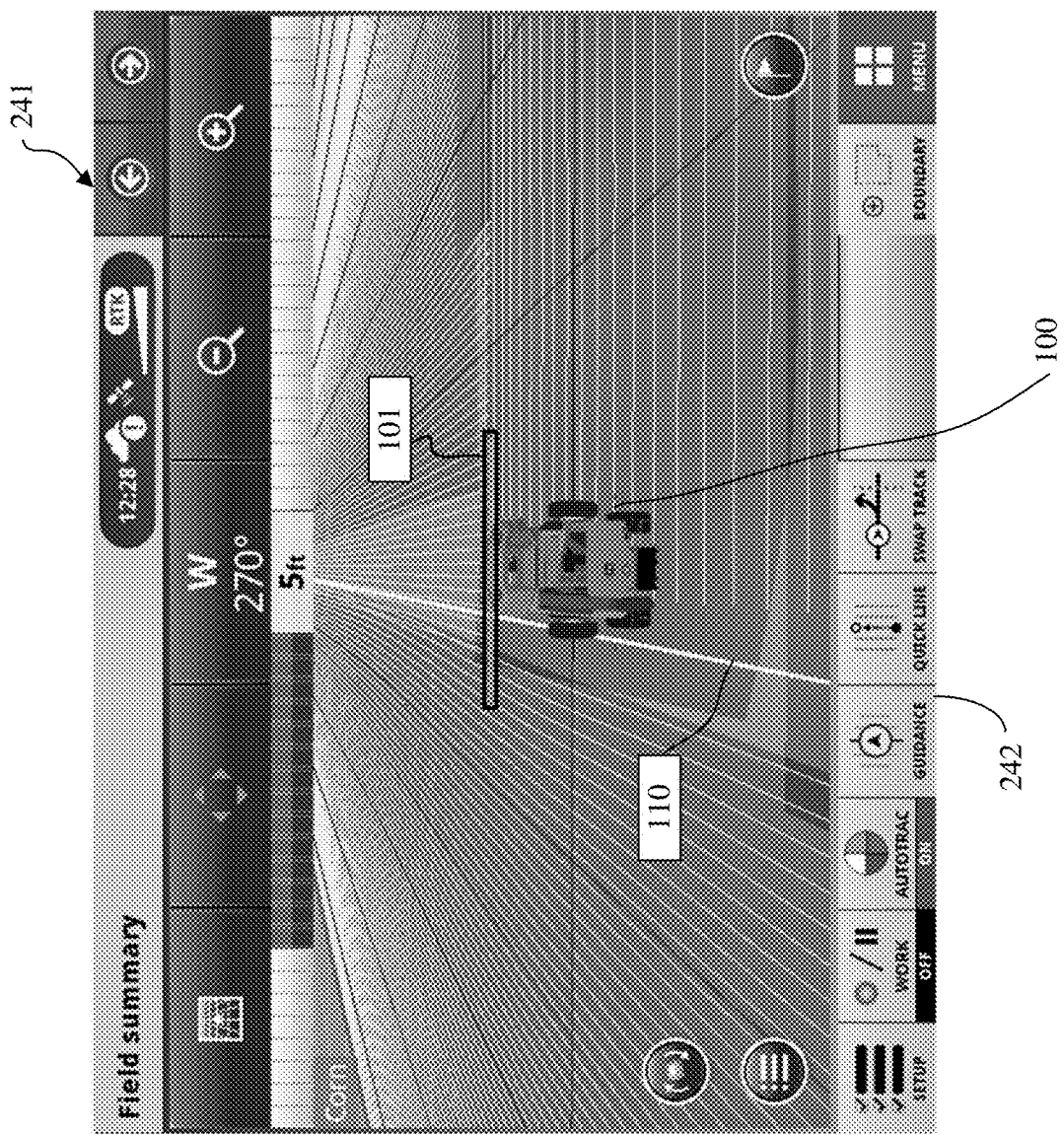
Figure 9:
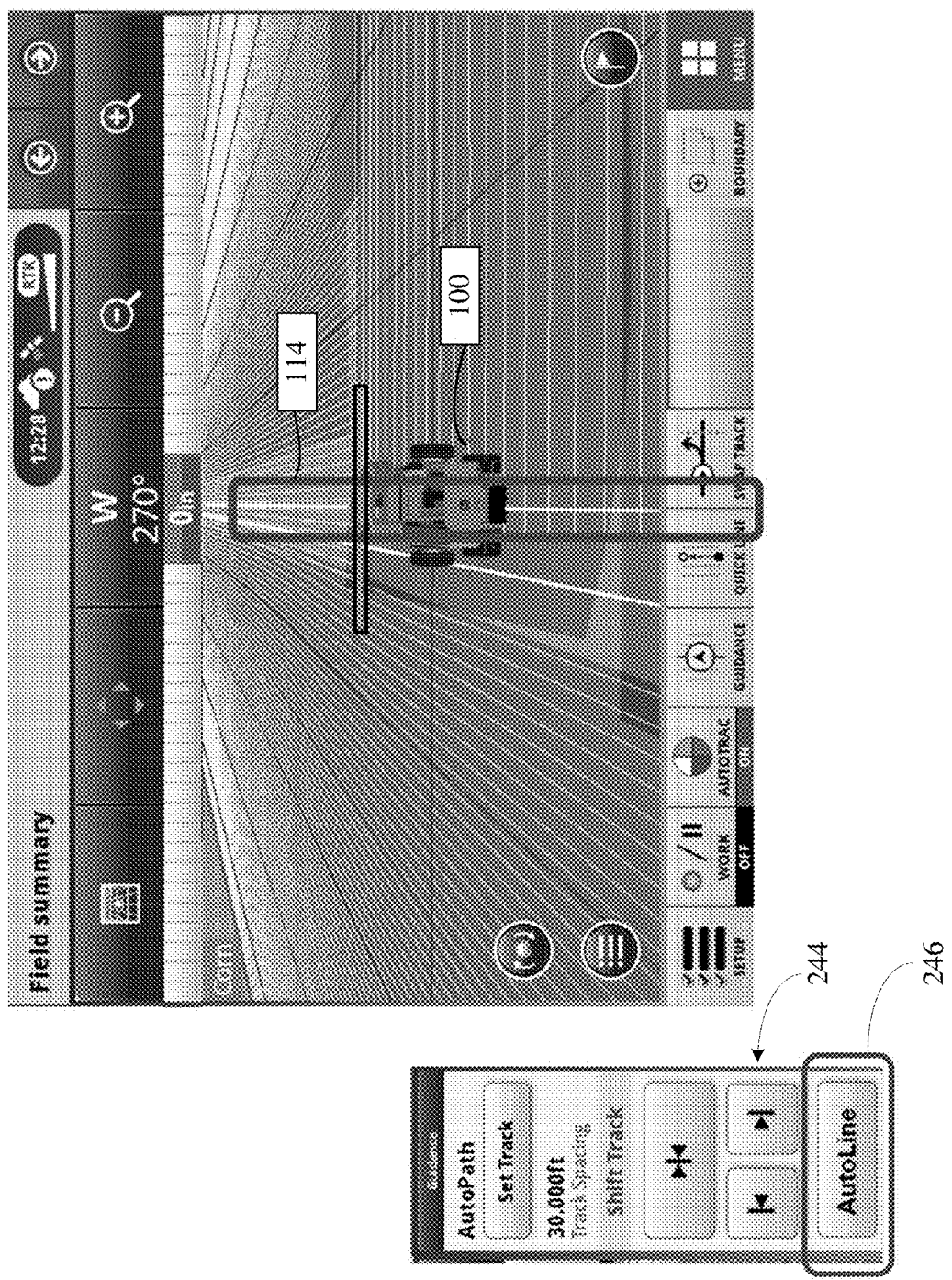

FIGS. 7-9 show examples of user interface displays that can be generated and used to detect an operator input indicating that the operator 208 wishes to shift a single guidance line. FIG. 7, for instance, shows a user interface display that may be displayed on a screen of the operator compartment of agricultural harvester 100, or on a display screen of a handheld or mobile device or at a remote location. FIG. 7 shows that agricultural harvester 100 is positioned in a similar position to that shown in FIG. 1, where agricultural harvester 100 is lined up to follow a current guidance line 110. However, when harvester 100 is aligned with guidance line 110, the amount of crop on the right of header 101 is unbalanced with respect to the amount of crop on the left of header 101. Therefore, the operator 208 navigates agricultural harvester 100 to a different location, such as that shown in FIG. 8. FIG. 8 shows that harvester 100 is now positioned and oriented so that the unharvested crop is dispersed more evenly across header 101.

Once harvester 100 is in the desired position, operator 208 can actuate an operator input mechanism, such as the guidance button 242 on display 241. In response, line/path shift processor 202 can generate a representation of an operator input mechanism that allows operator 208 to cause the guidance line to be shifted.

FIG. 9 shows one example in which an operator actuatable input mechanism 244 is displayed with an auto line actuator 246. When operator 208 actuates the auto line actuator 246 (such as by actuating it using a point and click device, a touch gesture, etc.), then line/path shift processor 202 recalculates the location of a guidance line based upon the position and orientation of agricultural harvester 100 relative to the position and orientation of the unharvested crop rows. Detecting the position and orientation of harvester 100 relative to the position and orientation of the unharvested crop rows is indicated by block 248 in the flow diagram of FIG. 6. Detecting that operator 208 has actuated the auto line actuator 246 is indicated by block 250 in the flow diagram of FIG. 6.

In such a scenario, line/path shift processor 208 re-generates the guidance line to shift the location of the current guidance line 110 to a shifted location, as illustrated by 114 in FIG. 9. The new guidance line 114 (or shifted guidance line 114) is shifted to a location where it is centered on agricultural harvester 100 and aligned with the unharvested crop rows. Shifting the guidance line to follow the crop rows based upon the current position and orientation of agricultural harvester 100 is indicated by block 252 in the flow diagram of FIG. 6.

Because operator 208 actuated the auto line actuator 246, line/path shift processor 208 retains the location of the other guidance lines on the field in their current, unshifted position, as indicated by block 254.

Navigation system 180 then navigates agricultural harvester 100 along the shifted guidance line 114, as indicated by block 256 in the flow diagram of FIG. 6. When agricultural harvester 100 has traversed shifted guidance line 114, then navigation system 180 reverts to navigating agricultural harvester 100 along a path that uses the other, unshifted guidance lines, as indicated by block 258 in the flow diagram of FIG. 6.

Figure 10:
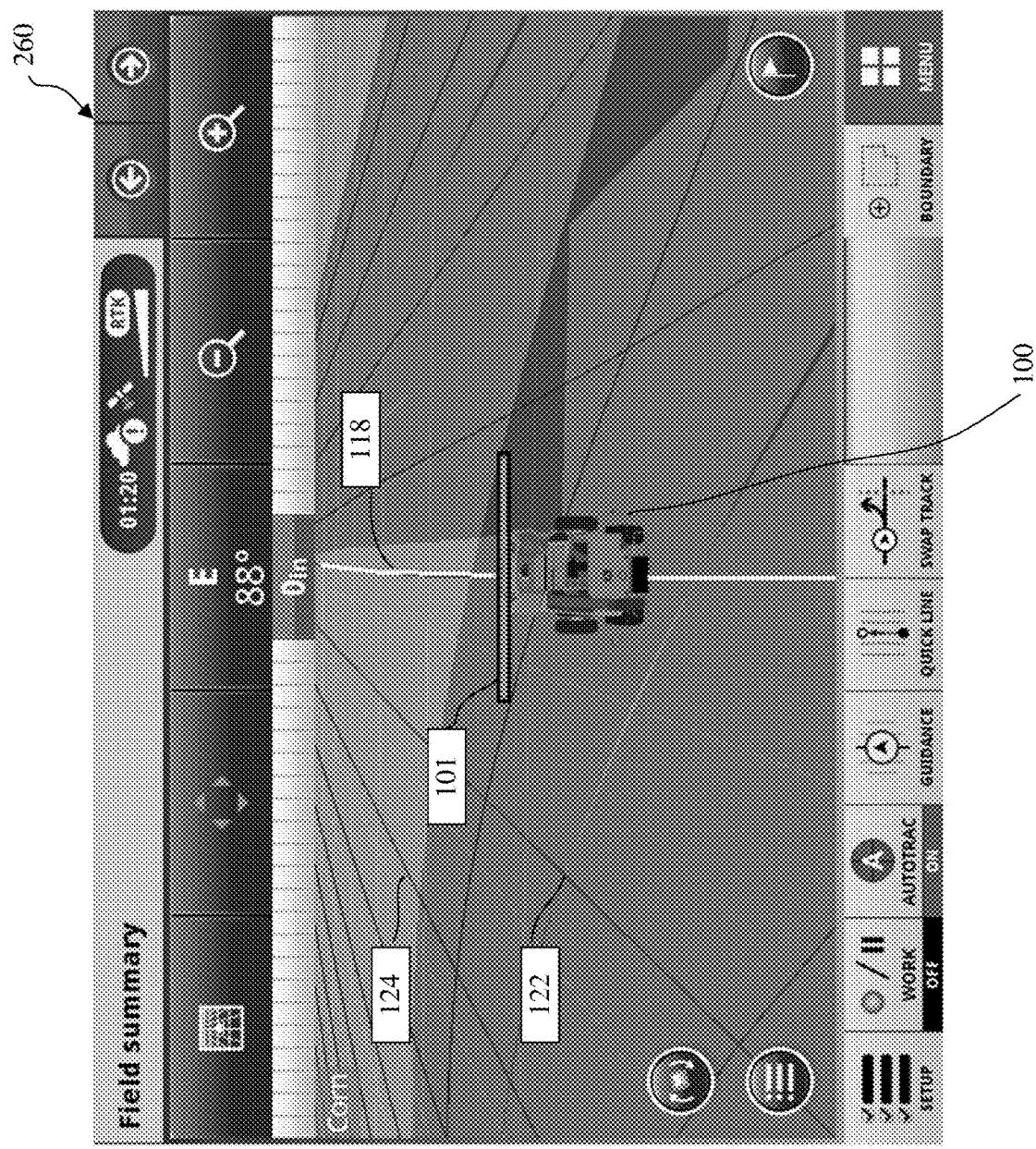
Figure 11:
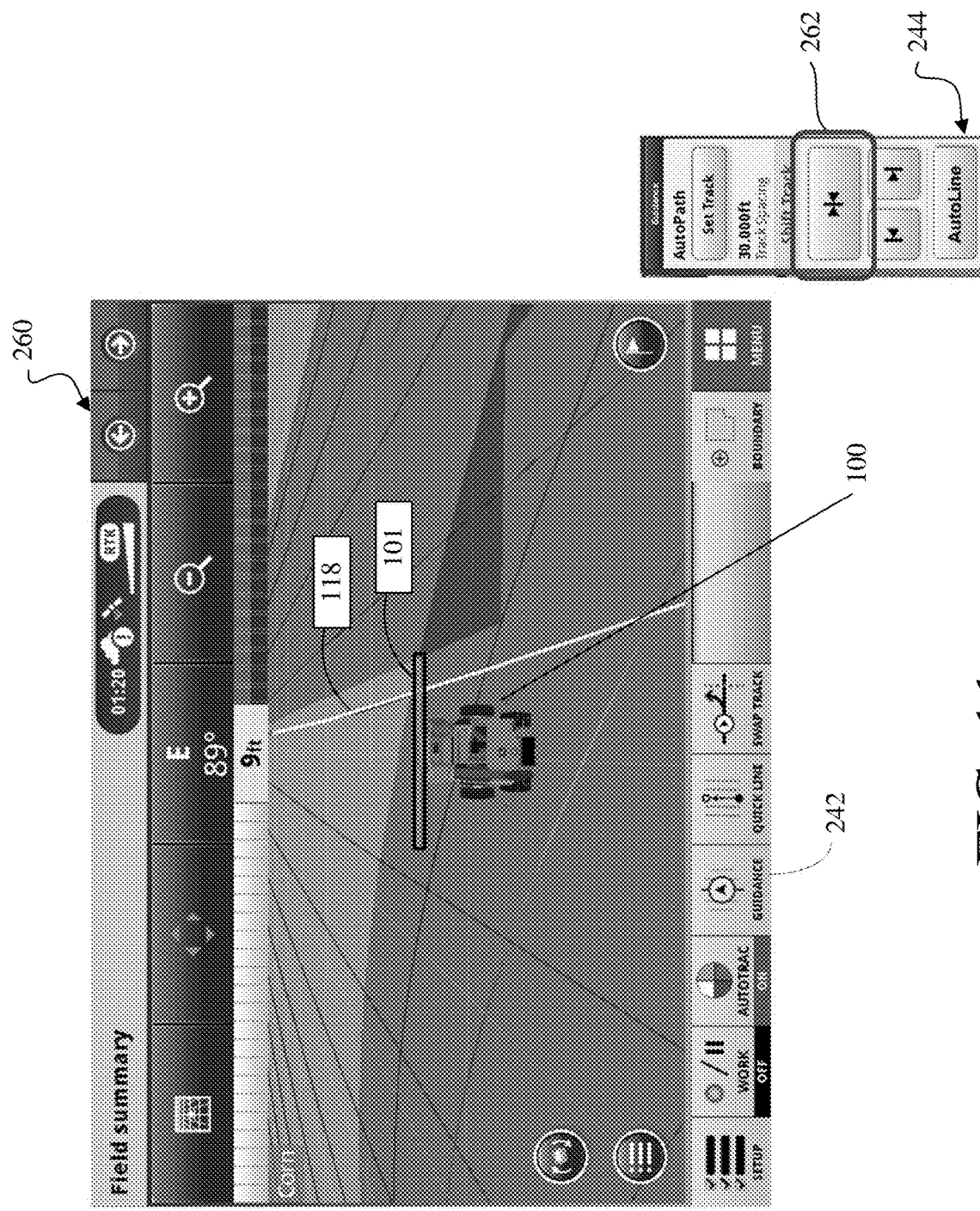
Figure 12:
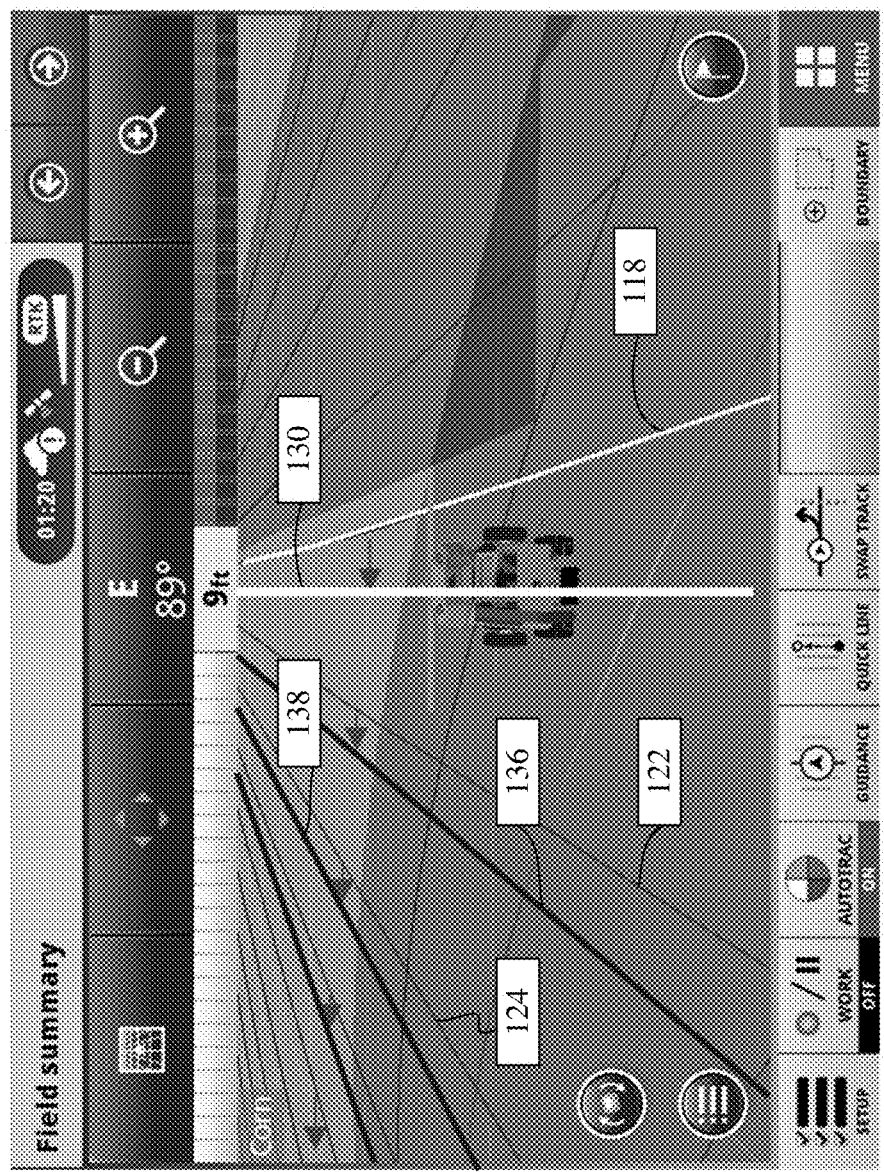

FIGS. 10, 11, and 12 show an example in which operator 208, instead of actuating the auto line actuator 246, actuates a shift center actuator to move an entire set of guidance lines instead of just a single guidance line.

FIG. 10 shows one example of a user interface display 260 that can be generated on a display device showing that agricultural harvester 100 is positioned in a similar position to that shown in FIG. 3 above. In FIG. 10, it can be seen that the unharvested crop is distributed unevenly across header 101 of agricultural harvester 100 when agricultural harvester 100 is aligned on guidance line 118. Therefore, operator 208 repositions agricultural harvester 100 to a position, such as that shown in FIG. 11, in which the unharvested crop is distributed evenly across the full width of header 101. Then, as described above with respect to FIG. 8, operator 208 can actuate the guidance actuator 242 on display 260. In response, line/path shift processor 208 generates a representation of an operator actuatable input mechanism 244 that includes a shift center actuator 262. In response to actuation of the shift center actuator 262, line/path shift processor 208 recalculates (or re-generates) the location of all of the guidance lines in a set of guidance lines to shift them all by the same amount. Guidance line 118 is shifted to a location where it is centered on agricultural harvester 100 and follows the location of the crop rows, as illustrated by guidance line 130 in FIG. 12. The other guidance lines 122, 124, etc., are also shifted by the same amount to new locations, as indicated by guidance lines 136, 138, etc.

Re-generating the guidance lines for the field or the guidance lines in a land being harvested (or another set of guidance lines) to follow the crop rows based upon the current position and orientation of agricultural harvester 100 is indicated by block 266 in the flow diagram of FIG. 6.

Navigation system 180 then controls navigation of agricultural harvester 100 to follow a path based upon the re-generated or shifted guidance lines. Controlling navigation of agricultural harvester 100 to follow the shifted guidance lines is indicated by block 268 in the flow diagram of FIG. 6.

It can thus be seen that the present description describes a system that facilitates using automated navigation to perform an agricultural operation in a field while also allowing an operator to easily shift a guidance line or a set of guidance lines quickly and efficiently. The operator simply repositions the mobile agricultural machine to a desired location and orientation in the field and provides an operator input indicative of whether the operator wishes a single guidance line to be shifted or a set of guidance lines to be shifted. The system automatically recalculates or re-generates the one or more guidance lines so that automated navigation can continue based upon the new position and orientation of the agricultural machine.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays the mechanisms has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, detectors, generators, and/or logic. It will be appreciated that such systems, components, detectors, generators, and/or logic can be comprised of hardware items (such as processors and associated memory, or other processing components, some of which are described below) that perform the functions associated with those systems, components, detectors, generators, and/or logic. In addition, the systems, components, detectors, generators, and/or logic can be comprised of software that is loaded into a memory and is subsequently executed by a processor or server, or other computing component, as described below. The systems, components, detectors, generators, and/or logic can also be comprised of different combinations of hardware, software, firmware, etc., some examples of which are described below. These are only some examples of different structures that can be used to form the systems, components, detectors, generators, and/or logic described above. Other structures can be used as well.

Figure 13:
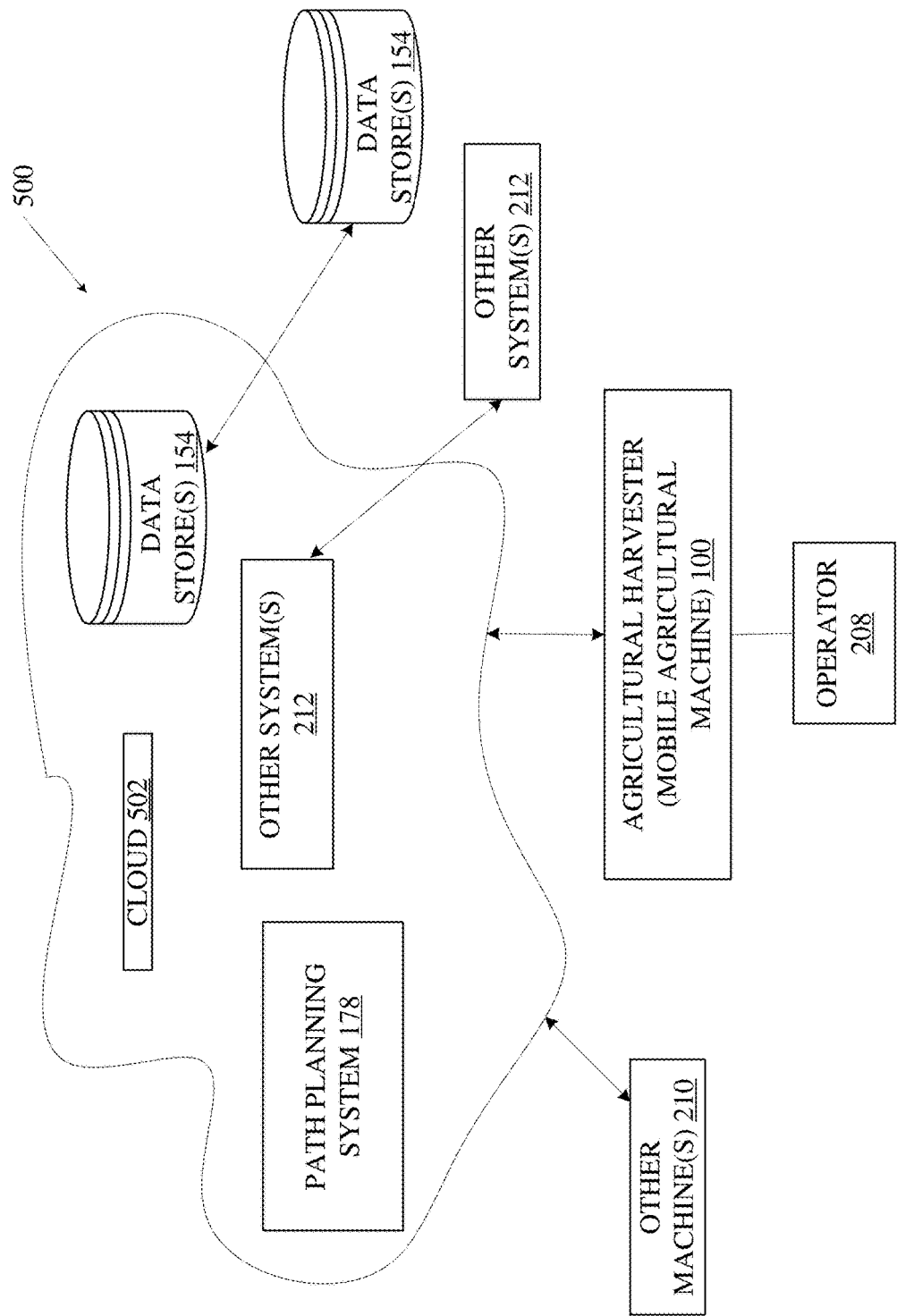
FIG. 13 is a block diagram of the agricultural system shown in FIG. 4, deployed in a remote server environment.

FIG. 13 is a block diagram of harvester 100, shown in FIG. 5, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 13, some items are similar to those shown in previous FIGS. and they are similarly numbered. FIG. 13 specifically shows that path planning system 178 and data store 154 can be located at a remote server location 502. Therefore, harvester 100 accesses those systems through remote server location 502.

As one example, path planning system 178 can be run in the cloud and accessed by an operator 208 or user through a browser. System 178 can expose an interface that allows the operator 208 or other user to view a representation of the crop rows in a field as well as a location of the navigation guidance lines. The operator 208 or other user can then select a location in the field (e.g. from the display) and request regeneration of one or more navigation guidance lines (e.g. by actuating an actuator on the display). System 178 then regenerates the one or more navigation guidance lines and displays them to the operator 208 or other user. The navigation guidance lines can also be sent to navigation system 180 so control signal generator 182 can control the controllable subsystems 184 to navigate machine 100 along the regenerated navigation guidance lines.

FIG. 13 also depicts another example of a remote server architecture. FIG. 13 shows that it is also contemplated that some elements of previous FIGS. are disposed at remote server location 502 while others are not. By way of example, path planning system 178 or data store 154 can be disposed at a location separate from location 502, and accessed through the remote server at location 502. Regardless of where the items are located, the items can be accessed directly by harvester 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
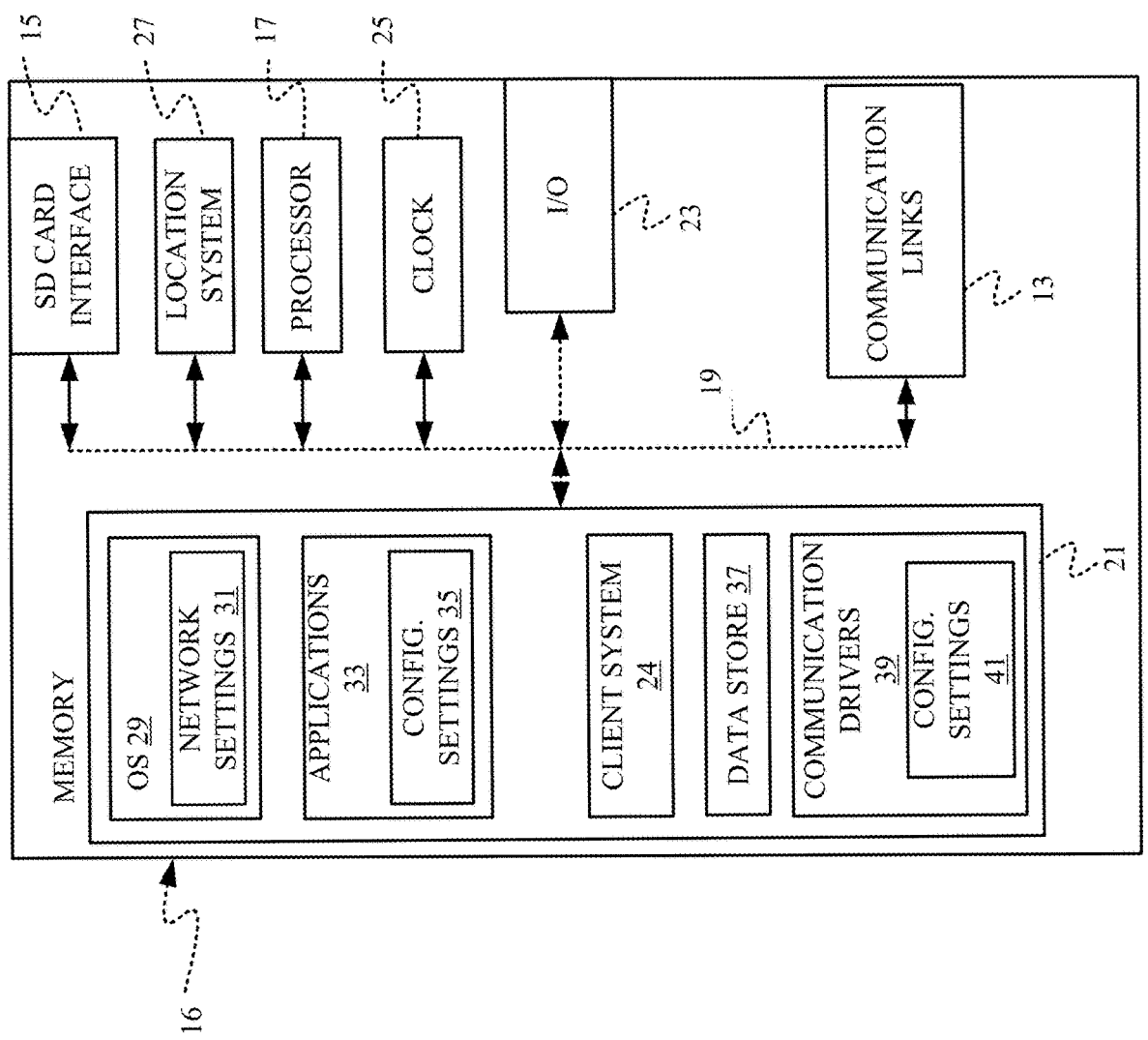
FIGS. 14, 15, and 16 show examples of mobile devices that can be used in the systems and architectures shown in other figures.
Figure 15:
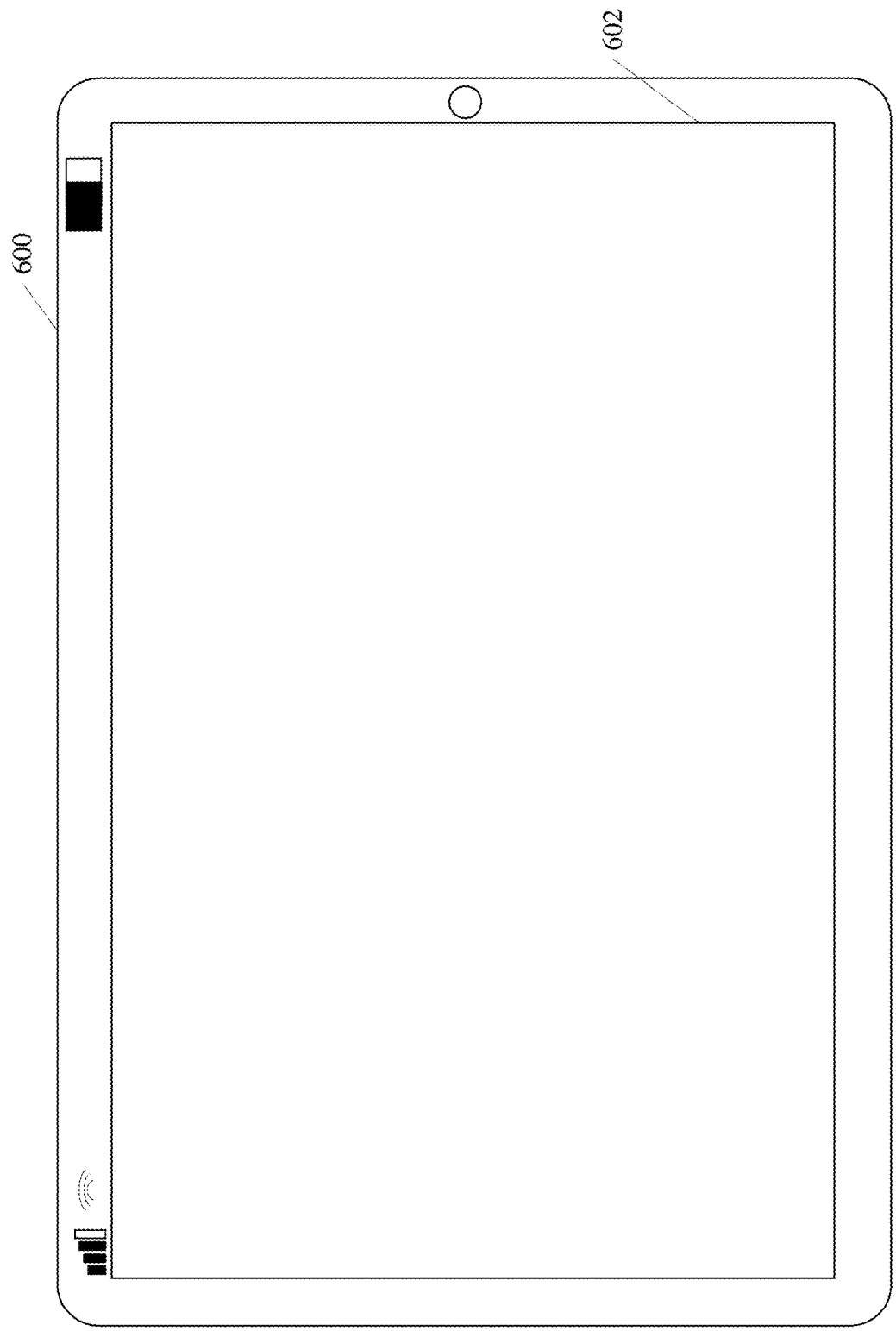
Figure 16:
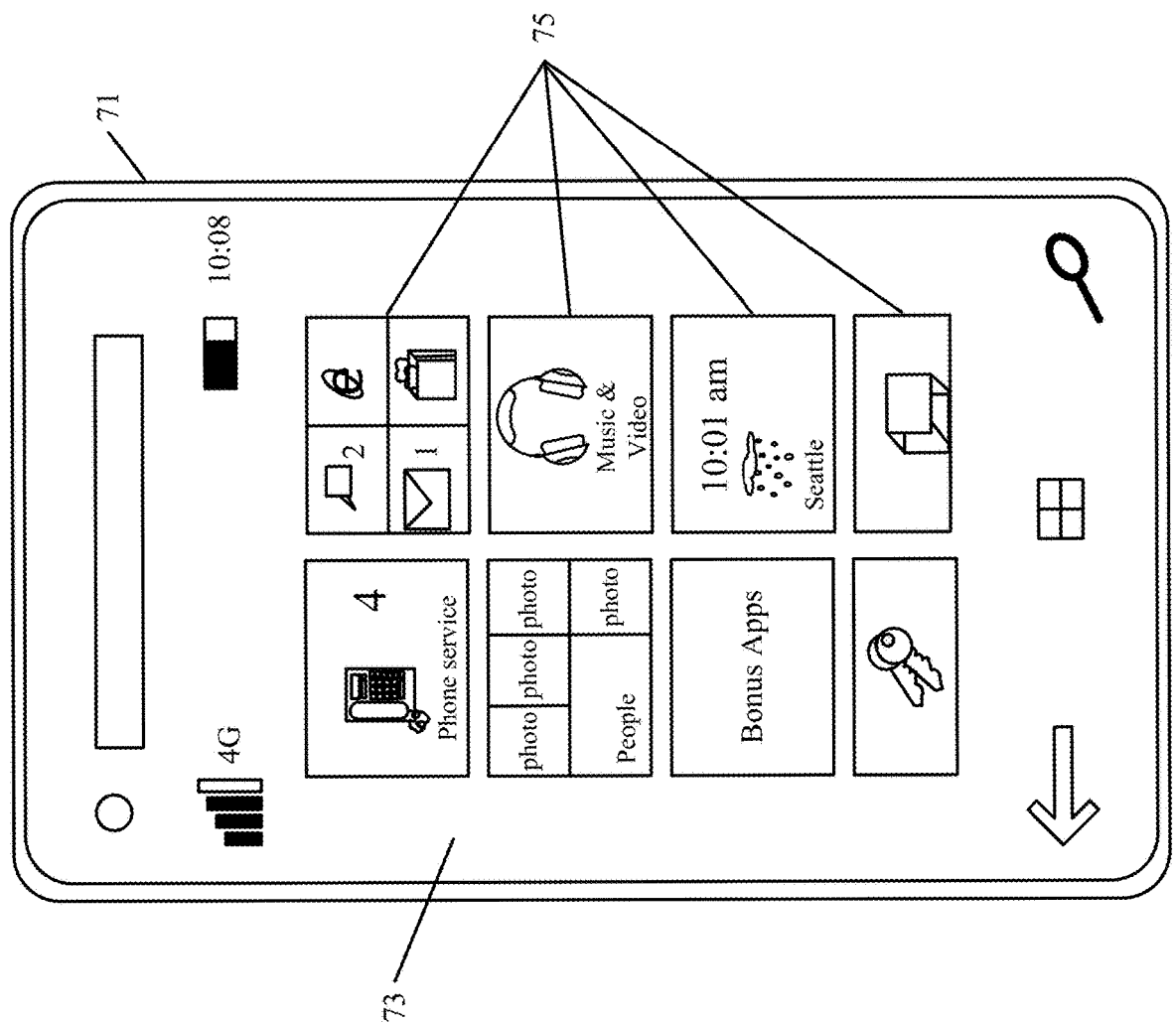

FIG. 14 is a simplified block diagram of one illustrative example of a handheld or mobile computing device that can be used as a user's or client's handheld device 16, in which the present system (or parts of it) can be deployed. For instance, a mobile device can be deployed in the operator compartment of harvester 100 for use in generating, processing, or displaying the stool width and position data. FIGS. 15-16 are examples of handheld or mobile devices.

FIG. 14 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 15 shows one example in which device 16 is a tablet computer 600. In FIG. 15, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 16 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
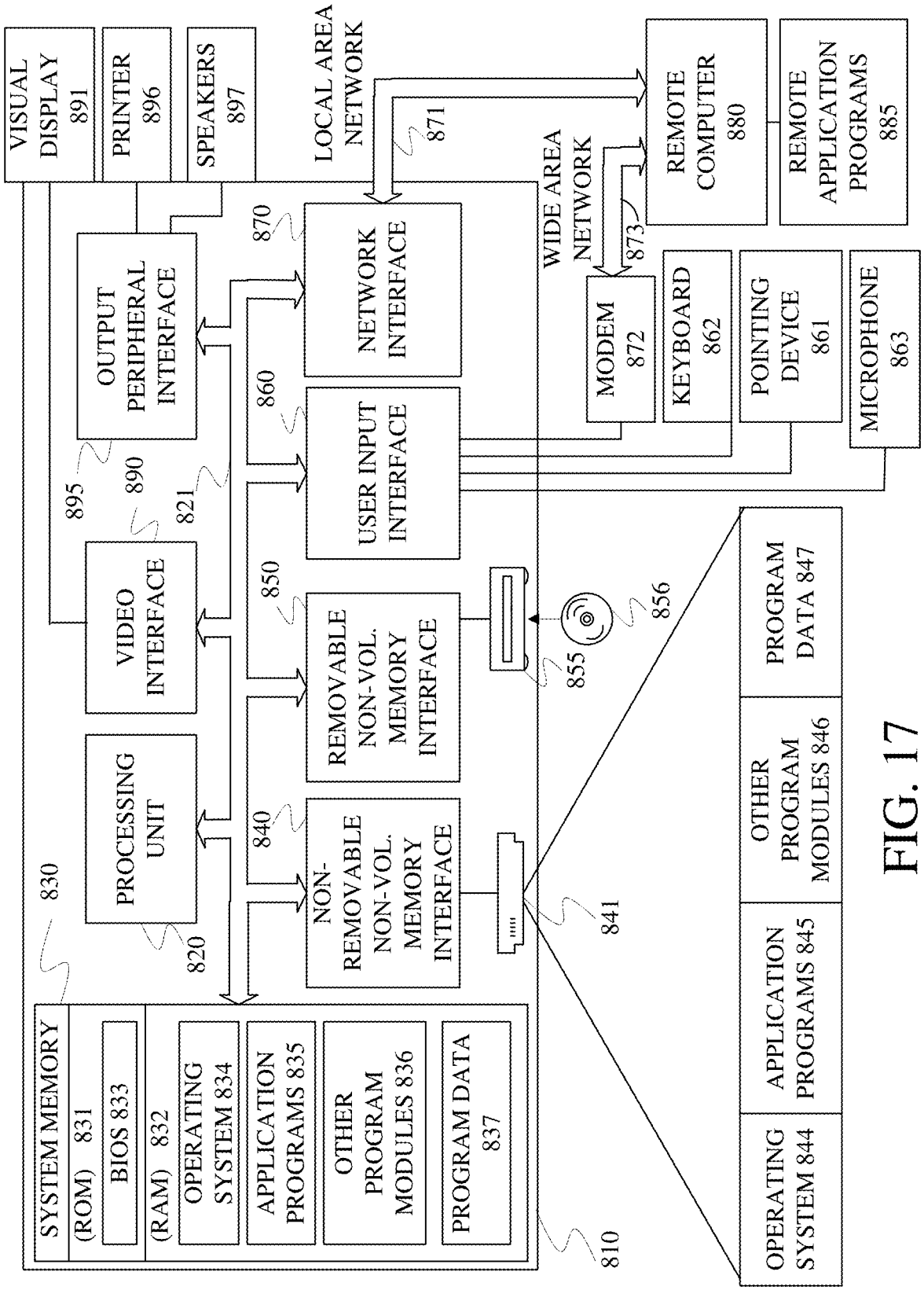
FIG. 17 is a block diagram of one example of a computing environment that can be used in systems and architectures shown in other figures.

FIG. 17 is one example of a computing environment in which elements of previous FIGS., or parts of them, (for example) can be deployed. With reference to FIG. 17, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 17.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 17 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
receiving, at a mobile agricultural machine, a set of navigation guidance lines;
detecting a location and orientation of the mobile agricultural machine relative to crop rows in a field;
detecting a modification operator input to modify the set of navigation guidance lines;
re-generating a navigation guidance line, of the set of navigation guidance lines, to obtain a modified navigation guidance line, based on the location and orientation of the mobile agricultural machine relative to the crop rows, wherein re-generating the navigation guidance line comprises:
re-generating the navigation guidance line based on a current location of the mobile agricultural machine and retaining locations of a remainder of the navigation guidance lines in the set of navigation guidance lines; and
controlling a controllable subsystem of the mobile agricultural machine based on the modified navigation guidance line.

2. The computer implemented method of claim 1 wherein controlling a controllable subsystem comprises:
controlling the controllable subsystem to navigate the mobile agricultural machine to follow the modified navigation guidance line.

3. The computer implemented method of claim 1 wherein controlling the controllable subsystem to navigate the mobile agricultural machine to follow the modified navigation guidance line comprises:
detecting that the mobile agricultural machine has finished traversing a portion of the field along the modified navigation guidance line; and
controlling the controllable subsystem to navigate the mobile agricultural machine along a navigation guidance line, of the remainder of the navigation guidance lines.

4. The computer implemented method of claim 1 wherein re-generating a navigation guidance line comprises:
re-generating all the navigation guidance lines in the set of navigation guidance lines based on the location and orientation of the mobile agricultural machine relative to the crop rows.

5. The computer implemented method of claim 2 wherein detecting a modification operator input comprises:
generating a representation of an operator display with a first guidance line adjustment actuator; and
detecting operator actuation of the first guidance line adjustment actuator, and wherein re-generating a navigation guidance line comprises modifying a single navigation guidance line based on the detected operator actuation of the first guidance line adjustment actuator.

6. The computer implemented method of claim 2 wherein detecting a modification operator input comprises:
generating a representation of an operator display with a second guidance line adjustment actuator; and
detecting operator actuation of the second guidance line adjustment actuator, and wherein re-generating a navigation guidance line comprises shifting the navigation guidance lines in the set of navigation guidance lines based on the detected operator actuation of the second guidance line adjustment actuator.

7. The computer implemented method of claim 1 wherein detecting a modification operator input comprises:
detecting the modification operator input from a remote device that is remote from the mobile agricultural machine.

8. The computer implemented method of claim 1 wherein detecting a modification operator input comprises:
  detecting the modification operator input from a device in an operator compartment of the mobile agricultural machine.

9. The computer implemented method of claim 1 wherein re-generating a navigation guidance line comprises:
  obtaining a location of the crop rows; and
  re-generating the navigation guidance line to follow the crop rows.

10. The computer implemented method of claim 1 wherein receiving a set of navigation guidance lines comprises:
  generating a path plan, including the set of navigation guidance lines, that defines a route of the mobile agricultural machine through a field.

11. A navigation control system for controlling navigation of a mobile agricultural machine, the navigation control system comprising:
  a path planning system configured to generate a set of navigation guidance lines;
  a position sensor configured to detect a location and orientation of the mobile agricultural machine relative to crop rows in a field;
  an operator interface system configured to detect a modification operator input to modify the set of navigation guidance lines;
  a shift processor configured to re-generate a navigation guidance line, of the set of navigation guidance lines, to obtain a modified navigation guidance line, based on the location and orientation of the mobile agricultural machine relative to the crop rows and responsive to the modification operator input, wherein the set of navigation guidance lines comprises a plurality of navigation guidance lines and wherein the shift processor is configured to re-generate the navigation guidance line based on a current location of the mobile agricultural machine and retain locations of a remainder of the plurality of navigation guidance lines in the set of navigation guidance lines; and
  a navigation system configured to control a controllable subsystem of the mobile agricultural machine based on the modified navigation guidance line.

12. The navigation control system of claim 11 wherein the controllable subsystem comprises a propulsion subsystem and a steering subsystem and wherein the navigation system is configured to control the propulsion subsystem and the steering subsystem to navigate the mobile agricultural machine to follow the modified navigation guidance line.

13. The navigation control system of claim 11 wherein the navigation control system is configured to detect that the mobile agricultural machine has finished traversing a portion of the field along the modified navigation guidance line and control the controllable subsystem to navigate the mobile agricultural machine along a navigation guidance line, of the remainder of the navigation guidance lines.

14. The navigation control system of claim 11 wherein the shift processor is configured to re-generate all of the plurality of navigation guidance lines in the set of navigation guidance lines based on the location and orientation of the mobile agricultural machine relative to the crop rows.

15. The navigation control system of claim 11 wherein the operator interface system is configured to generate a representation of an operator interface display with a first guidance line adjustment actuator; and detect, as the modification operator input, operator actuation of the first guidance line adjustment actuator, and wherein the shift processor is configured to modify a single navigation guidance line based on the detected operator actuation of the first guidance line adjustment actuator.

16. The navigation control system of claim 11 wherein the operator interface system is configured to generate a representation of an operator interface display with a second guidance line adjustment actuator and detect, as the modification operator input, operator actuation of the second guidance line adjustment actuator, and wherein the shift processor is configured to shift the plurality of navigation guidance lines in the set of navigation guidance lines based on the detected operator actuation of the second guidance line adjustment actuator.

17. A computer system, comprising:
  at least one processor; and
  a data store storing computer executable instructions which, when executed by the at least one processor, cause the at least one processor to perform steps, comprising:
    exposing an interface through a web browser indicative of a set of rows in a field and a set of navigation guidance lines configured for navigation of an agricultural machine through the field;
    detecting an operator input through the interface indicative of a request to regenerate at least one navigation guidance line of the set of navigation guidance lines;
    regenerating the at least one navigation guidance line based on a location in the field and based on the request, wherein re-generating the at least one navigation guidance line comprises:
      re-generating the at least one navigation guidance line based on a current location of the agricultural machine and retaining locations of a remainder of the navigation guidance lines in the set of navigation guidance lines; and
    generating control signals to control a controllable subsystem of the agricultural machine based on the regenerated at least one navigation guidance line.

18. The computer system of claim 17 wherein generating a control signal to control a controllable subsystem comprises:
  generating control signals to control a controllable subsystem to navigate the agricultural machine to follow the regenerated at least one navigation guidance line.

* * * * *